(12) United States Patent
Lee

(10) Patent No.: US 9,090,008 B2
(45) Date of Patent: Jul. 28, 2015

(54) RECEIVING CONTAINER, METHOD OF MANUFACTURING THE SAME AND LIQUID CRYSTAL DISPLAY HAVING THE SAME

(75) Inventor: Kyoung-Don Lee, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 1478 days.

(21) Appl. No.: 12/061,440

(22) Filed: Apr. 2, 2008

(65) Prior Publication Data

US 2008/0273138 A1 Nov. 6, 2008

(30) Foreign Application Priority Data

Apr. 2, 2007 (KR) .................. 10-2007-0032296

(51) Int. Cl.
| | | |
|---|---|---|
| *G02F 1/1333* | (2006.01) | |
| *F21V 7/04* | (2006.01) | |
| *B29C 45/14* | (2006.01) | |
| *B29L 12/00* | (2006.01) | |
| *B29L 31/34* | (2006.01) | |

(52) U.S. Cl.
CPC .... *B29C 45/14344* (2013.01); *G02F 1/133308* (2013.01); *B29L 2012/00* (2013.01); *B29L 2031/3475* (2013.01); *G02F 2001/133314* (2013.01); *G02F 2201/503* (2013.01); *Y10T 428/13* (2015.01)

(58) Field of Classification Search
USPC .................. 349/58, 59, 60; 362/632–634
See application file for complete search history.

(56) References Cited

U.S. PATENT DOCUMENTS

| | | | | |
|---|---|---|---|---|
| 6,175,396 B1* | 1/2001 | Kim et al. | .......... | 349/58 |
| 6,801,268 B2* | 10/2004 | Huang et al. | .......... | 349/58 |
| 7,083,318 B2* | 8/2006 | Ha et al. | .......... | 362/633 |
| 2005/0280750 A1* | 12/2005 | Cho et al. | .......... | 349/58 |
| 2007/0126335 A1* | 6/2007 | You et al. | .......... | 313/485 |
| 2007/0216826 A1* | 9/2007 | Lee et al. | .......... | 349/58 |

FOREIGN PATENT DOCUMENTS

| | | |
|---|---|---|
| JP | 2002-215051 | 7/2002 |
| JP | 2002-268063 | 9/2002 |
| JP | 2004-240239 | 8/2004 |
| JP | 2005-121929 | 5/2005 |
| JP | 2005-346932 | 12/2005 |
| JP | 2006-053532 | 2/2006 |
| KR | 1020050121006 A | 12/2005 |
| WO | 2007-023846 A1 | 3/2007 |

* cited by examiner

*Primary Examiner* — Robert Tavlykaev
(74) *Attorney, Agent, or Firm* — Innovation Counsel LLP

(57) ABSTRACT

A receiving container, a method of manufacturing the receiving container, and a liquid crystal display having the same are provided. The receiving container includes a mold frame and a strength enhancing means. The mold frame includes a first portion and a second portion connected to the first portion. The strength enhancing means includes a base plate for supporting a lower part of the backlight assembly, and a strength enhancing portion connected to at least a part of the base plate for surrounding at least a part of the second portion.

13 Claims, 15 Drawing Sheets

RECEIVING CONTAINER, METHOD OF MANUFACTURING THE SAME AND LIQUID CRYSTAL DISPLAY HAVING THE SAME

CROSS-REFERENCE TO RELATED APPLICATION

This application claims priority under 35 U.S.C. §119 to Korean Patent Application No. 10-2007-0032296, filed on Apr. 2, 2007 in the Korean Intellectual Property Office (KIPO), the contents of which is incorporated herein by reference in its entirety.

BACKGROUND OF THE INVENTION

1. Field of the Invention

The disclosure relates to a receiving container, a method of manufacturing the mold frame, and a liquid crystal display having the same.

2. Description of the Related Art

A liquid crystal display (LCD) is representative of flat panel displays and has the advantage of a smaller size, lighter weight, lower power consumption, and the like in comparison with a cathode ray tube (CRT). Due to these unique advantages, the LCD is widely applied to numerous industries including, for example, the computer industry, the electronic industry, the information communication industry, and the like.

In order to implement a lightweight, thin, and compact LCD design research continues on various LCD elements including, for example, a backlight, a connector, a printed circuit board, a coupling structure, and the like.

The LCD includes an LCD panel, a backlight assembly for providing light to the LCD panel, and a drive circuit portion for generating various signals required to implement an image in the LCD panel. The LCD further includes a bottom chassis and a mold frame for receiving the LCD panel and the backlight assembly.

As LCDs are slim, ultra-compact and ultra-thin LCD panels are being developed. However, the ultra-compact and ultra-thin LCD panels have strength limitations. Accordingly, when the ultra-thin LCD panel is a large size the mold frame and the bottom chassis may not sufficiently protect the backlight assembly and the LCD panel from an external impact.

SUMMARY OF THE INVENTION

An aspect of the invention provides a receiving container, a method of manufacturing the mold frame, and a liquid crystal display having the same that can protect a liquid crystal display panel and a backlight assembly from an external impact using the receiving container including a mold frame and a strength enhancing means.

According to an aspect of the invention, there is provided a receiving container including: a mold frame; and a strength enhancing means, wherein the mold frame includes: a first portion and a second portion connected to the first portion, and the strength enhancing means includes: a base plate, and a strength enhancing portion connected to at least a part of the base plate.

The mold frame may include a hole formed between the first portion and the second portion.

The strength enhancing means may include a connecting portion passing through the hole for connecting the strength enhancing portion and the base plate.

A width of the second portion may be at least 0.5 mm.

The strength enhancing portion may be formed by at least two strength enhancing portions.

The strength enhancing means may further include an inner wall connected to an inner side surface of the second portion and a part of the base plate.

The strength enhancing portion may be formed to surround a part of an outer sidewall of the second portion.

The strength enhancing portion may be formed between an upper part and a lower part of the outer sidewall of the second portion.

The receiving container may further include an auxiliary portion connected to the second portion and formed in a lower side of the strength enhancing portion.

The auxiliary portion may be formed to have the same width as the strength enhancing portion.

The strength enhancing portion may be formed to surround the outer side surface of the second portion.

The strength enhancing portion may be formed up to a lower part of the second portion.

The mold frame may further include a protective wall extending from an upper side of the first portion to protect a side surface of the liquid crystal display panel.

The mold frame may be formed in a plastic material.

The strength enhancing means may be formed in a metal material.

According to another aspect of the invention there is provided a method of manufacturing a receiving container, including the steps of: forming a strength enhancing means; fixing the strength enhancing means to a fixed mold; connecting the fixed mold to a movable mold; and forming a mold frame connected to the strength enhancing means.

The step of forming the mold frame may further include the steps of: injecting a resin material into a space formed by the fixed mold and the movable mold; curing the resin material; and separating the fixed mold and the movable mold.

According to a further aspect of the invention, there is provided a liquid crystal display including: a liquid crystal display panel for displaying an image; a backlight assembly for supplying light to the liquid crystal display panel; and a receiving container for receiving the liquid crystal display panel and the backlight assembly, wherein the receiving container includes a mold frame and a strength enhancing means, the mold frame including: a first portion and a second portion connected to the first portion, the strength enhancing means including: a base plate, and a strength enhancing portion connected to at least a part of the base plate, wherein at least a part of second fixing portion is surrounded by the strength enhancing portion.

The first portion may position the backlight assembly and supports the liquid crystal display panel.

The second portion may position the liquid crystal display panel.

BRIEF DESCRIPTION OF THE DRAWINGS

The above and other features and advantages of the invention will be more clearly understood from the following detailed description taken in conjunction with the accompanying drawings, in which.

DETAILED DESCRIPTION OF THE EXEMPLARY EMBODIMENTS

Hereinafter, exemplary embodiments will be described in detail with reference to FIGS. 1 to 18B.

Figure 1:
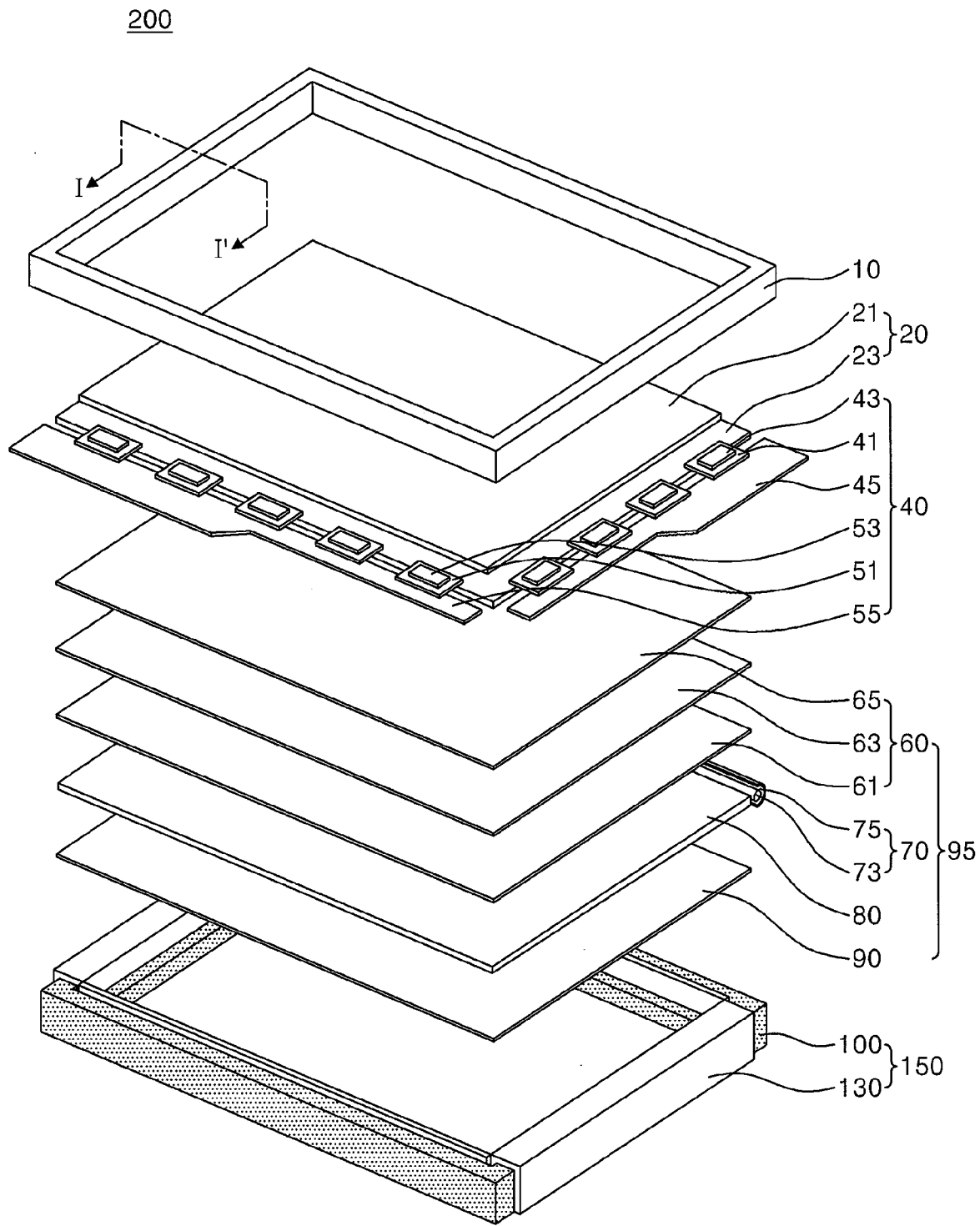
FIG. 1 is a perspective view showing an LCD in accordance with an exemplary embodiment.

FIG. 1 is a perspective view showing an LCD in accordance with an exemplary embodiment.

Referring to FIG. 1, an LCD 200 includes a top chassis 10, an LCD panel 20, a drive circuit portion 40, a backlight assembly 95, and a receiving container 150.

The top chassis 10 is arranged in an upper part of the LCD panel 20. The top chassis 10 protects the LCD panel 20 and the backlight assembly 95 from an external impact. The top chassis 10 has an opening in the center to expose a display area of the LCD panel 20.

The LCD panel 20 includes a color filter substrate 21, a thin-film transistor (TFT) substrate 23, and a liquid crystal layer.

The color filter substrate 21 includes a black matrix formed on an upper substrate of glass, plastic, or the like to shield light, and further includes red, green, and blue (RGB) color filters formed in regions divided by the black matrix to implement colors. The color filter substrate 21 further includes a common electrode for applying a common voltage to the liquid crystal, and an upper alignment film coated on the common electrode for liquid crystal alignment.

The TFT substrate 23 includes data and gate lines formed to intersect each other between which a gate insulating film is interposed on a lower substrate of glass, plastic, or the like, and a TFT connected to the data and gate lines. The TFT substrate 23 further includes a pixel electrode for applying a pixel voltage to the liquid crystal, and a lower alignment film coated on the pixel electrode for liquid crystal alignment. The TFT includes a gate electrode connected to the gate line, a source electrode connected to the data line for surrounding a part of the drain electrode, and the drain electrode connected to the pixel electrode and facing the source electrode.

The amount of light transmission is adjusted by rotating the liquid crystal(s) on the basis of a difference between the common voltage from the common electrode of the color filter substrate 21 and the pixel voltage from the pixel electrode of the TFT substrate 23. Accordingly, the liquid crystal is made of a material having dielectric constant anisotropy and refractive index anisotropy.

The drive circuit portion 40 includes a gate drive integrated circuit (IC) 43 for driving gate lines of the LCD panel 20 and a data drive IC 53 for driving data lines of the LCD panel 20. The drive circuit portion 40 further includes a timing controller (not shown), a power supply (not shown), and various circuit elements (not shown), and generates various signals required to implement an image. The timing controller, the power supply, and the various circuit elements are attached to printed circuit boards (PCBs) 45 and 55.

Various signal circuits on the gate PCB 45 and the data PCB 55 are electrically connected to the gate and data lines through a gate tape carrier package (TCP) 41 and a data TCP 51. The power supply and the timing controller mounted on the PCBs 45 and 55 generate a power signal and a control signal using various externally supplied electric signals.

The backlight assembly 95 includes a lamp unit 70, a reflective sheet 90, a light guide plate 80, and an optical sheet 60.

An edge-lighting method is used in which light emitted from a lamp 73 of the lamp unit 70 arranged in parallel with the LCD panel 20 is incident on the LCD panel 20 by the light guide plate 80. The lamp 73 can be formed with a cold cathode fluorescent lamp (CCFL) or external electrode fluorescent lamp (EEFL). The lamp 73 is surrounded by a lamp housing 75. The lamp housing 75 is made of a highly reflective material or has a reflective member coated on a cover surface to cover the lamp 73 to reflect the light from the lamp 73 in a direction of the light guide plate 80, thereby enhancing light efficiency.

The light guide plate 80 is used to uniformly transfer light from the lamp unit 70 to a screen display region. Conventionally, the light guide plate 80 includes a transparent acrylic material having a thickness of about several millimeters (mm) and further includes a plurality of dots or V-shaped grooves (not shown) formed in a lower surface to uniformly reflect the light. The light guide plate 80 is formed in a size corresponding to that of the LCD panel 20.

Alternatively, a direct-lighting method can be used in which a plurality of lamps are disposed in a rear side surface of a diffusion sheet 61 arranged in parallel with the LCD panel 20. In this manner, the lamp light is directly incident on the LCD panel 20 without using the light guide plate 80.

The optical sheet 60 causes varying light properties of the light emitted from the light guide plate 80 to be incident on the LCD panel 20. For this, the optical sheet 60 includes the diffusion sheet 61 for diffusing light incident from the light guide plate 80, and a prism sheet 63 for vertically emitting the light from the diffusion sheet 61. The optical sheet 60 is provided on the diffusion sheet 61 or the prism sheet 63 to protect the dust and/or scratch sensitive sheets. The optical sheet 60 is provided with a protective sheet 65 to prevent the sheets from moving when the backlight assembly 95 is carried. Accordingly, the optical sheet 60 causes the light emitted from the light guide plate 80 to be vertically incident on the LCD panel 20, thereby enhancing light efficiency.

The reflective sheet 90 reduces the loss of light by retro-reflecting the light incident through a rear surface of the light guide plate 80 toward the light guide plate 80 using a plate of high light reflectance. For this, the reflective sheet 90 has a reflective member of high reflectivity coated on a base material. The base material uses steel, stainless (SUS), brass, aluminum, polyethylene terephthalate (PET), or the like. The reflective member uses Ag, Ti, or the like.

The receiving container 150 is arranged in a lower part of the backlight assembly 95. The receiving container 150 includes a mold frame 100 and a strength enhancing means 130. The receiving container 150 protects the LCD panel 20 and the backlight assembly 95 from an external impact even when used with a relatively thin LCD 200.

Next, a receiving container in accordance with exemplary embodiments will be described in detail with reference to FIGS. 2 to 13.

Figure 2:
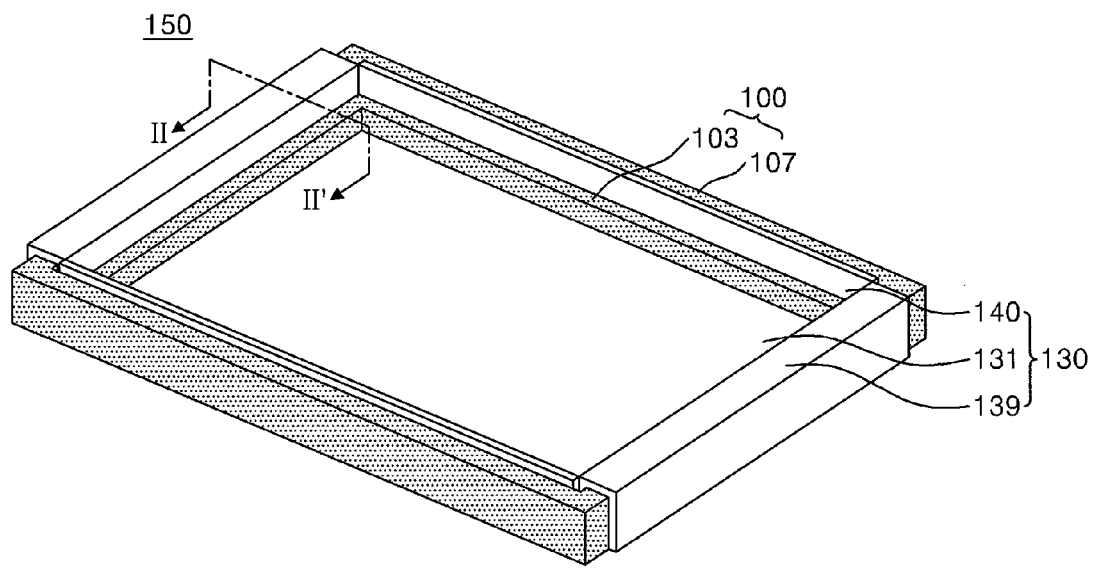
FIG. 2 is a perspective view showing a receiving container of FIG. 1 in accordance with a first exemplary embodiment.

FIG. 2 is a perspective view showing the receiving container of FIG. 1 in accordance with a first exemplary embodiment.

Referring to FIG. 2, the receiving container 150 includes a mold frame 100 and a strength enhancing means 130. The receiving container 150 has a generally rectangular frame and is formed by unifying the mold frame 100 and the strength enhancing means 130.

As shown in FIGS. 2, 3, 4A, and 4B, the mold frame 100 includes a seating portion 103, a fixing portion 107, a hole 105, and a contacting portion 109. The mold frame 100 may be formed with of a plastic material.

The seating portion 103 is formed on a base plate 131 of the strength enhancing means 130. The seating portion 103 is formed to be stepped from the base plate 131 to support the LCD panel 20. The seating portion 103 fixes the backlight assembly 95 in position so that it does not move. The height of the seating portion 103 may be equal to or greater than that of the backlight assembly 95 to support the LCD panel 20 and prevent the backlight assembly 95 from moving.

The fixing portion 107 is connected to the seating portion 103 by the contacting portion 109. The width "w" of the fixing portion 107 is about 0.5 mm or greater. For example, when the width "w" of the fixing portion 107 is less than 0.5 mm, the fixing portion 107 may not absorb an external impact applied to the LCD 200. Accordingly, the width "w" of the fixing portion 107 may be formed at 0.5 mm or greater. The fixing portion 107 is formed to have a greater height than the seating portion 103 to prevent the LCD panel 20 from moving.

Figure 5:
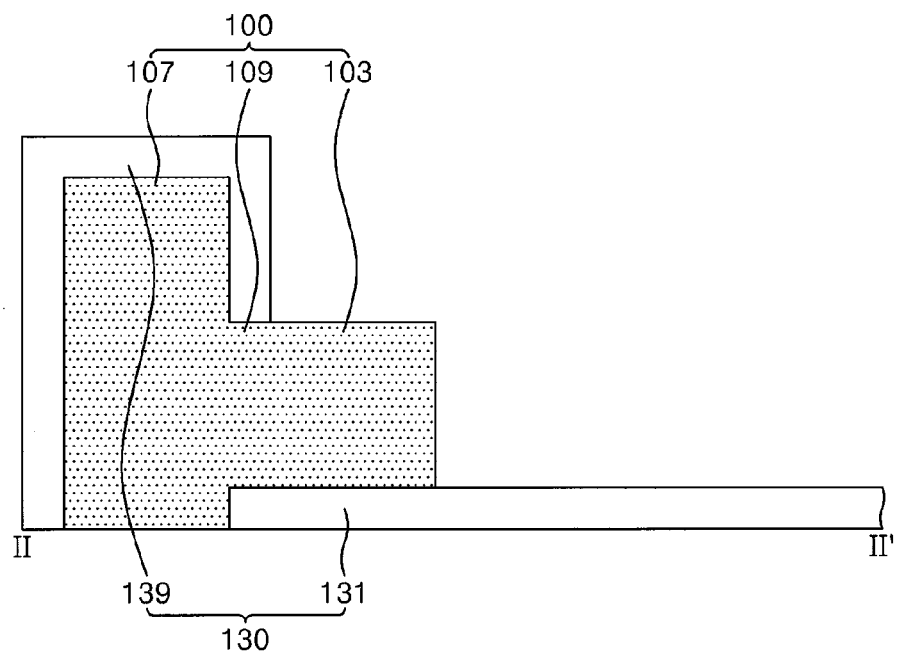
FIG. 5 is a cross-sectional view showing the receiving container taken along the line II-II' shown in FIG. 2.

As shown in FIG. 5, the contacting portion 109 connects the fixing portion 107 and the seating portion 103. The contacting portion 109 may be formed to have the same height as the seating portion 103. The position and shape of the contacting portion 109 can be varied according to its intended application.

Holes 105 are formed between the seating portion 103 and the fixing portion 107. For illustrative purposes, the holes 105 are shown formed along four sides between the fixing portion 107 and the seating portion 103. However, if desired, the holes may be formed along a fewer number of sides between the fixing portion 107 and the seating portion 103.

Figure 3:
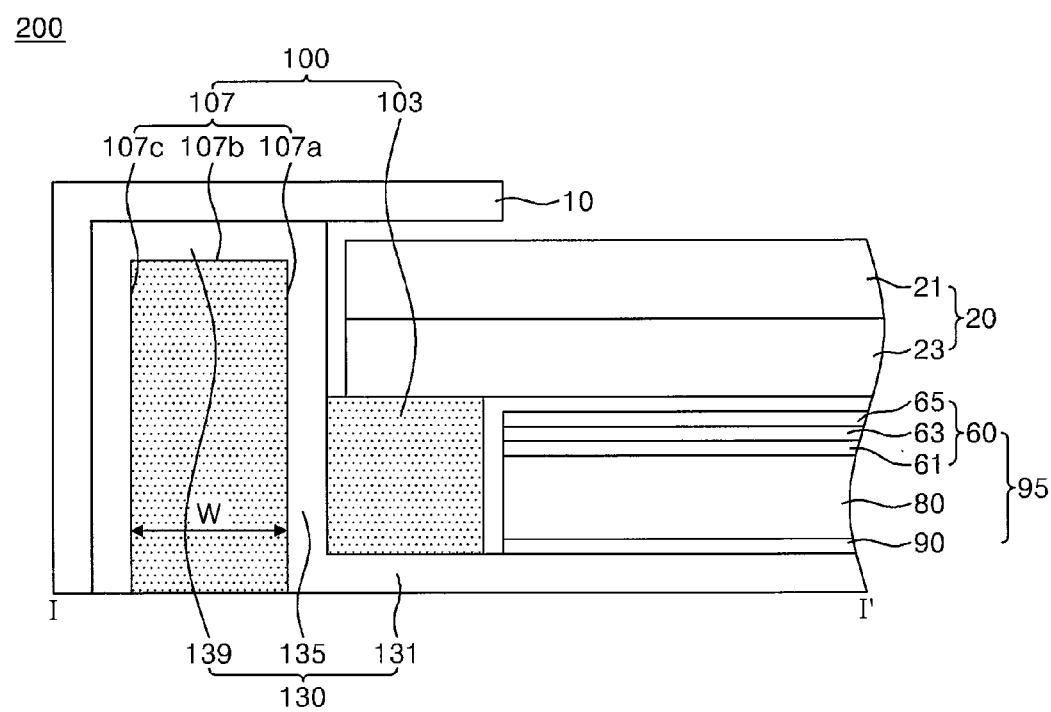
FIG. 3 is a cross-sectional view showing the LCD taken along the line I-I' shown in FIG. 1.
Figure 6:
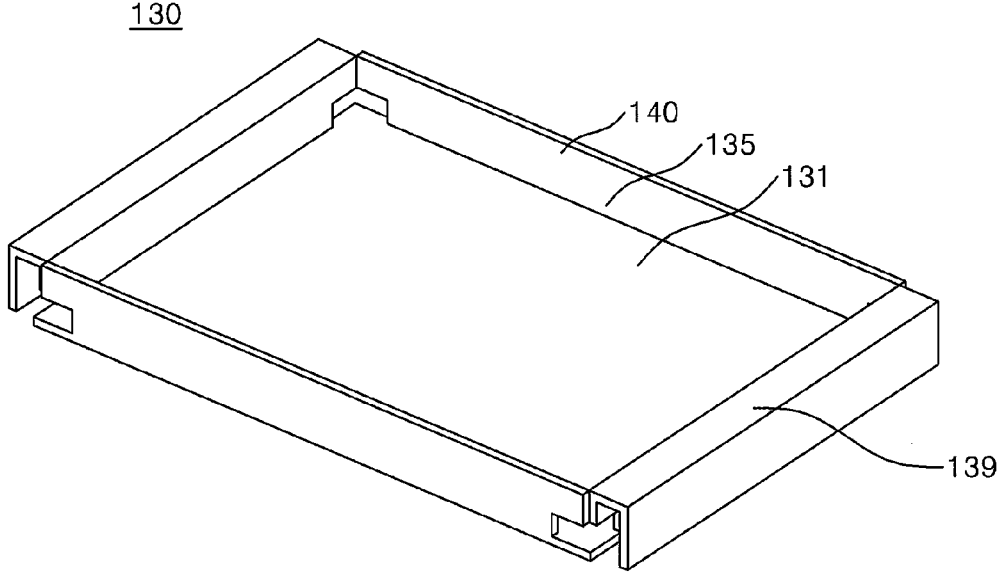
FIG. 6 is a perspective view illustrating a strength enhancing means shown in FIG. 3.

As shown in FIGS. 2, 3, and 6, the strength enhancing means 130 includes the base plate 131, a connecting portion 135, an inner wall 140, and a strength enhancing portion 139. The strength enhancing means 130 includes two strength enhancing portions 139 formed at opposite ends of the strength enhancing means 130. For convenience, only one strength enhancing portion will be described herein. The strength enhancing means 130 may be formed of a metal material.

The base plate 131 includes a generally rectangular shape and forms the lowest part of the receiving container 150 to support the backlight assembly 95 and the LCD panel 20.

Figure 4A:
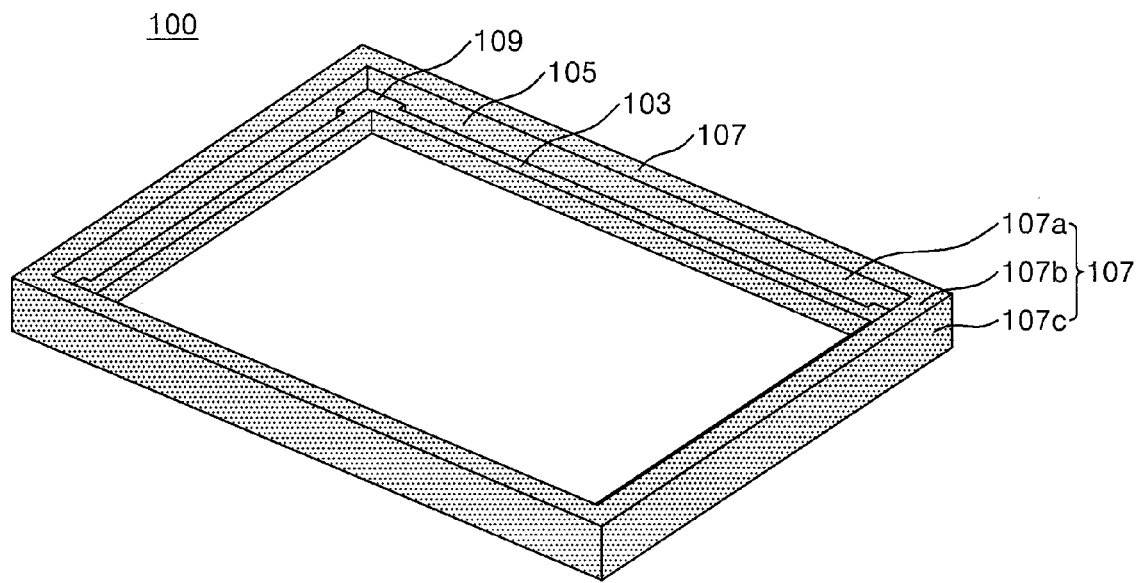
FIGS. 4A and 4B are perspective and plan views illustrating the receiving container shown in FIG. 3.
Figure 4B:
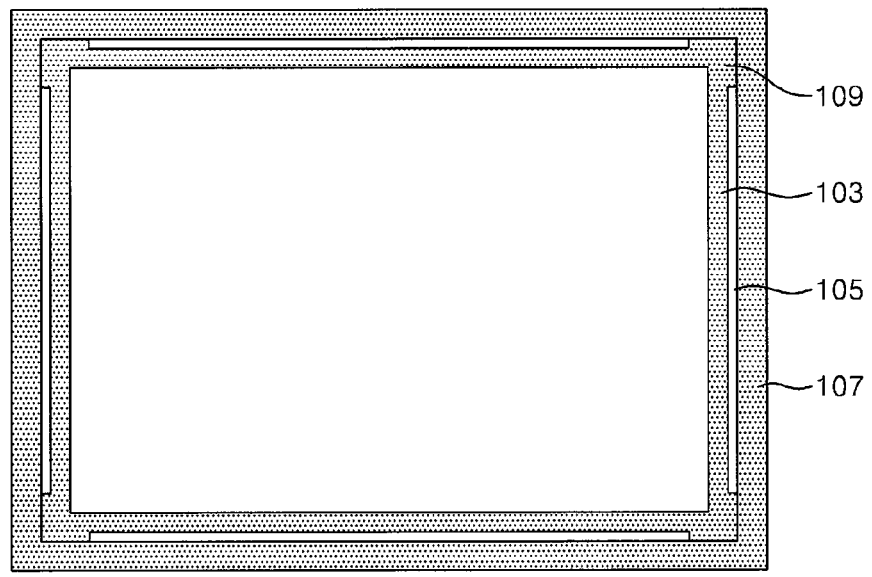

As shown in FIG. 4A, the connecting portion 135 passes through the hole 105 of the mold frame 100 and connects the base plate 131 and the strength enhancing portion 139. The connecting portion 135 is connected to an inner side surface 107a of the supporting fixing portion 107 and is formed to be vertical to the base plate 131.

The strength enhancing portion 139 is formed to extend from the connecting portion 135. The strength enhancing portion 139 surrounds the fixing portion 107 of the mold frame 100 on three sides. Specifically, the strength enhancing portion 139 is formed to surround the inner side surface 107a, a top surface 107b, and an outer side surface 107c of the fixing portion 107. Accordingly, when an external impact is applied to the LCD 200, the strength enhancing portion 139 absorbs the impact to protect the LCD 200. The strength enhancing portion 139 may be formed up to a lower part of the fixing portion 107.

The inner wall 140 is formed to extend from the connecting portion 135. The inner wall 140 is formed in one side surface of the base plate 131, adjacent the strength enhancing portion 139, and is connected to the inner side surface 107a of the fixing portion 107.

Figure 7:
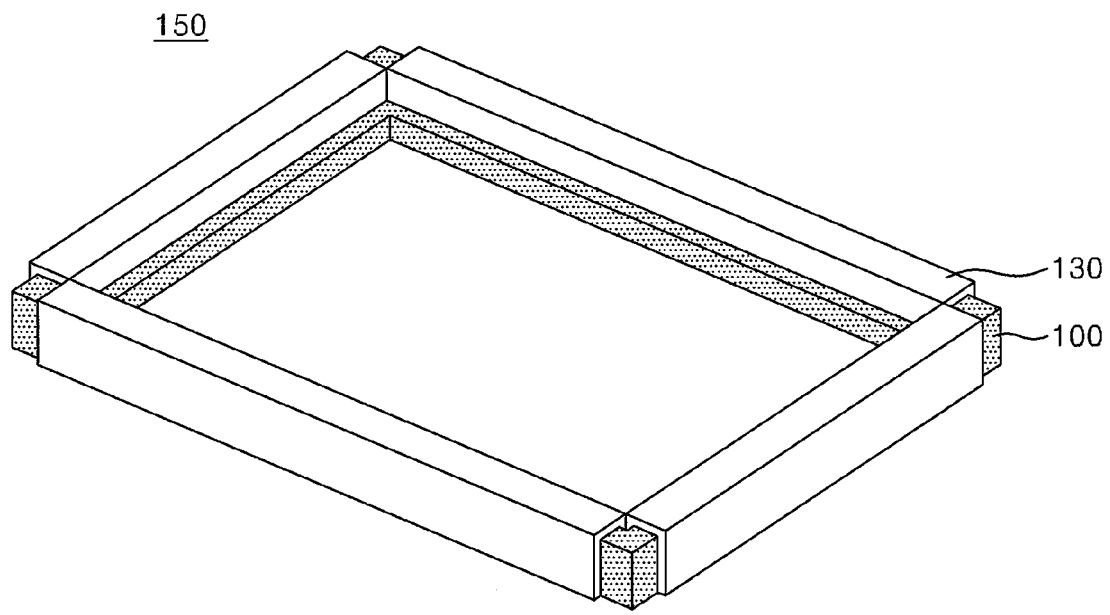
FIG. 7 is a perspective view showing a receiving container in accordance with a second exemplary embodiment.
Figure 8:
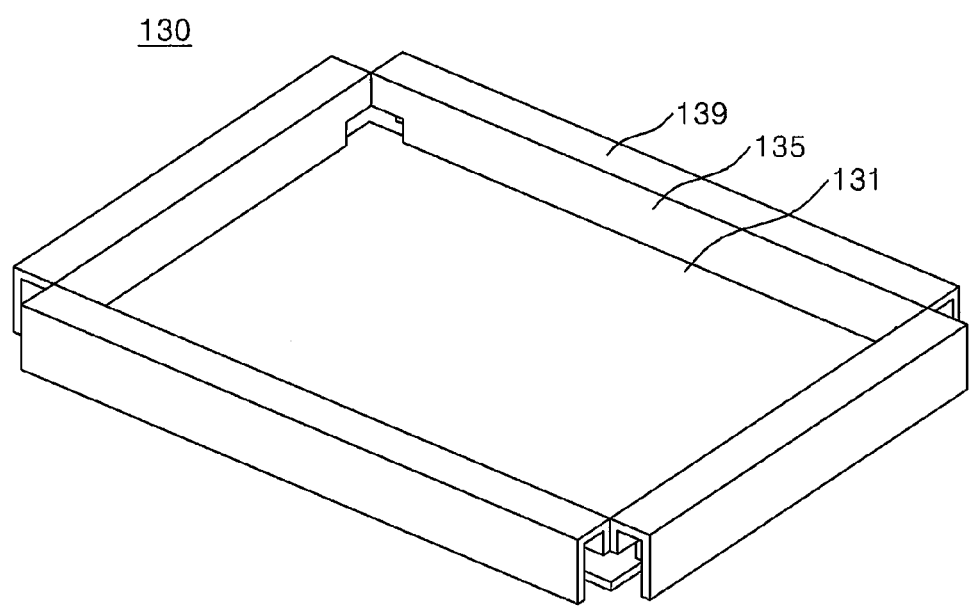
FIG. 8 is a perspective view illustrating a strength enhancing means shown in FIG. 7.

FIG. 7 is a perspective view showing a receiving container in accordance with a second exemplary embodiment, and FIG. 8 is a perspective view illustrating a strength enhancing means shown in FIG. 7.

Referring to FIGS. 7 and 8, a receiving container 150 includes a mold frame 100 and a strength enhancing means 130.

The strength enhancing means 130 includes a base plate 131, a connecting portion 135, and a strength enhancing portion 139. Four strength enhancing portions 139 connected to connecting portions 135 are formed in four side surfaces of the base plate 131. When an external impact is applied, the strength enhancing portions 139 protect the backlight assembly and the LCD panel from the impact. An example in which the two or four strength enhancing portions 139 are formed in FIGS. 1 to 8 has been described, but three strength enhancing portions 139 can be formed.

The mold frame 100 includes a seating portion 103, a fixing portion 107, a hole 105, and a contacting portion 109. Since the components of the mold frame 100 are the same as those of the mold frame described with reference to FIGS. 2 and 3, a detailed description is omitted.

Figure 9:
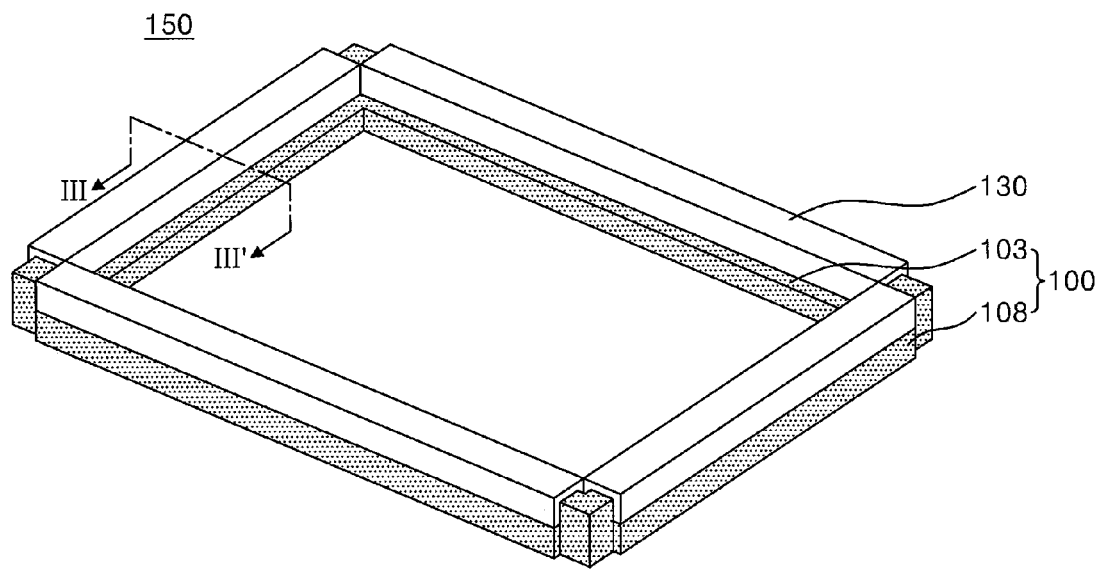
FIG. 9 is a perspective view showing a receiving container in accordance with a third exemplary embodiment.
Figure 10:
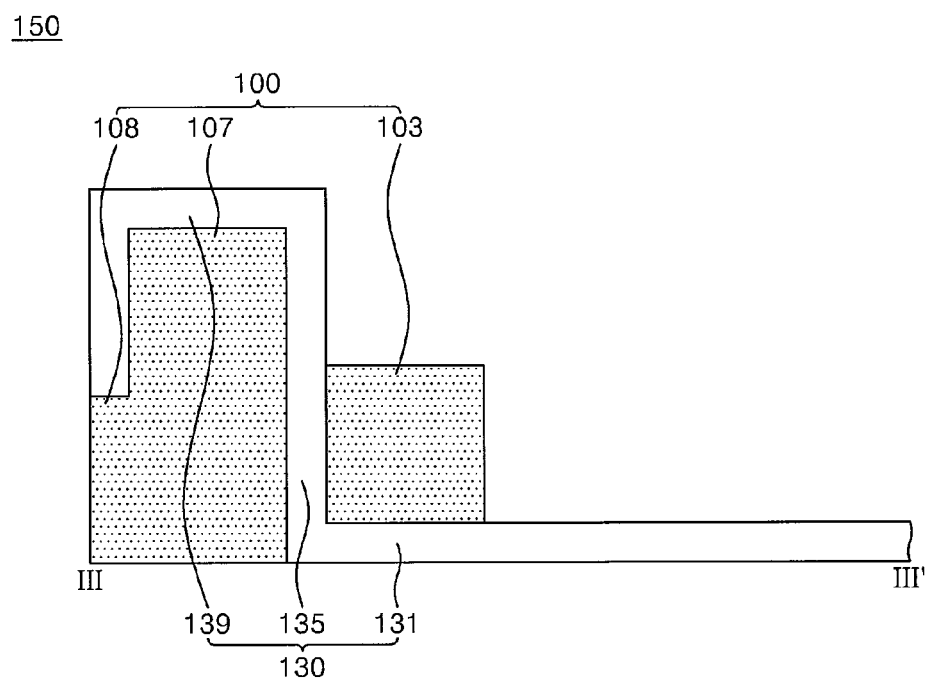
FIG. 10 is a cross-sectional view showing the receiving container taken along the line III-III' shown in FIG. 9.

FIG. 9 is a perspective view showing a receiving container in accordance with a third exemplary embodiment, and FIG. 10 is a cross-sectional view showing the receiving container taken along the line III-III' shown in FIG. 9.

Referring to FIGS. 9 and 10, a receiving container 150 includes a mold frame 100 and a strength enhancing means 130.

The strength enhancing means 130 includes a base plate 131 for supporting a lower part of a backlight assembly, a strength enhancing portion 139, and a connecting portion 135 for connecting the base plate 131 and the strength enhancing portion 139. The strength enhancing portion 139 is formed to surround a part of a fixing portion 107 of the mold frame 100. Specifically, the strength enhancing portion 139 can be formed about an upper half of the fixing portion 107. Accordingly, the strength enhancing portion 139 absorbs an external impact applied to the LCD, thereby protecting the LCD panel and the backlight assembly from the impact. An example in which the strength enhancing portion 139 is formed about the upper half of the fixing portion 107 has been described, but the strength enhancing portion 139 can be formed between upper and lower parts of the fixing portion 107.

The mold frame 100 includes a seating portion 103 for positioning the backlight assembly and supporting the LCD panel. The mold frame further includes a fixing portion 107 connected to the seating portion 103 for fixing a position of the LCD panel. The mold frame 100 includes an auxiliary portion 108 formed to receive or connect to a lower side of the strength enhancing portions 139. A width of the auxiliary portion 108 may be the same as that of the strength enhancing portion 139.

Figure 11:
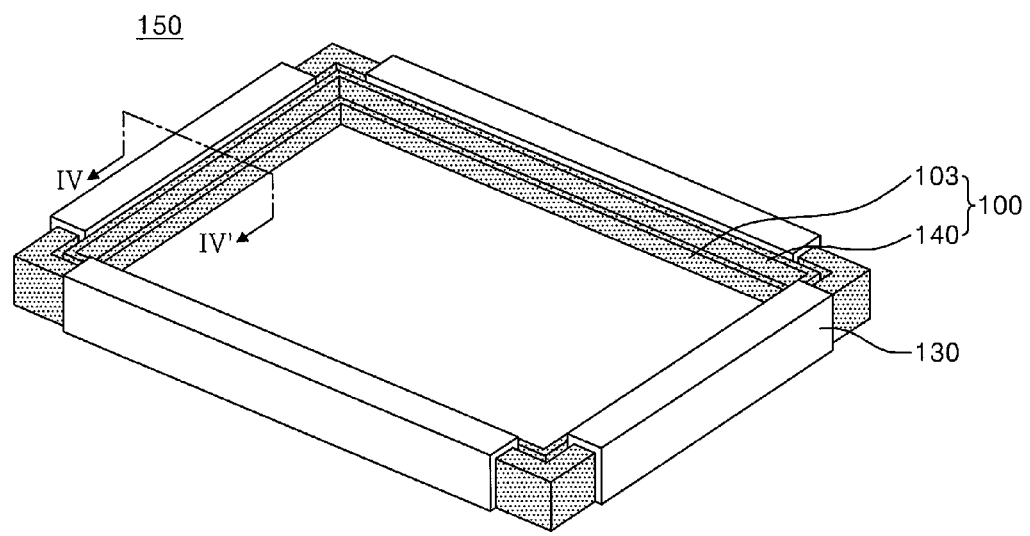
FIG. 11 is a perspective view showing a receiving container in accordance with a fourth exemplary embodiment.
Figure 12:
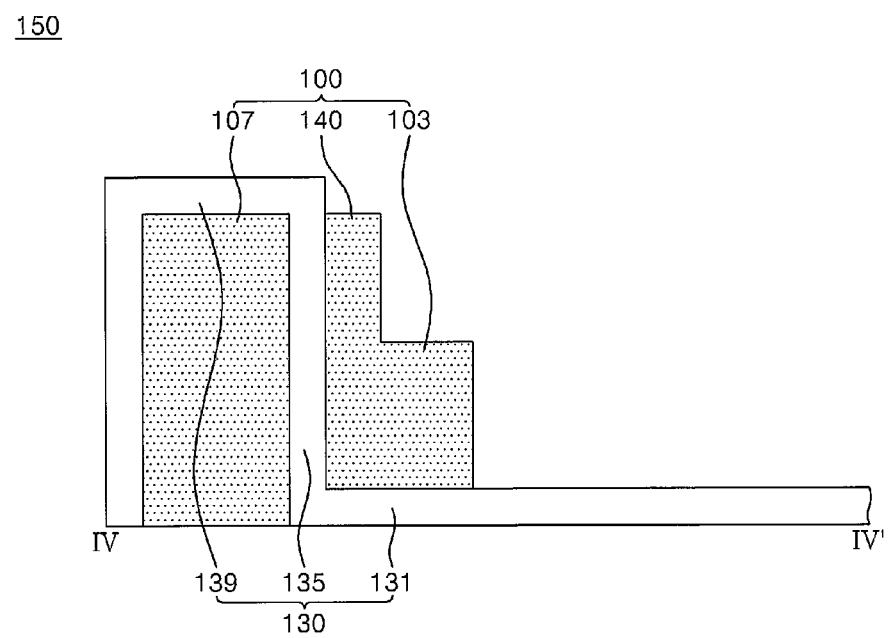
FIG. 12 is a cross-sectional view showing the receiving container taken along the line IV-IV' shown in FIG. 11.
Figure 13A:
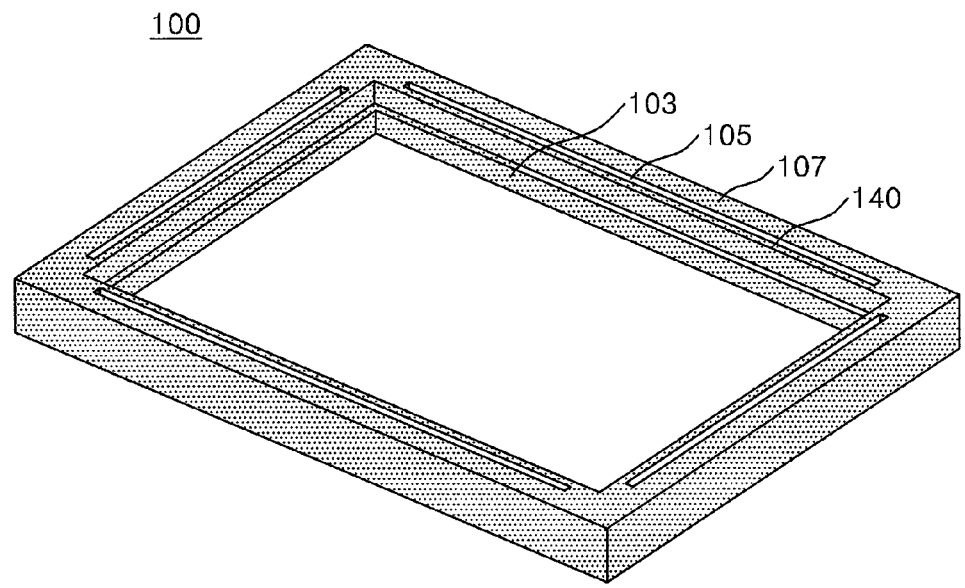
FIGS. 13A and 13B are perspective and plan views illustrating the receiving container shown in FIG. 11.
Figure 13B:
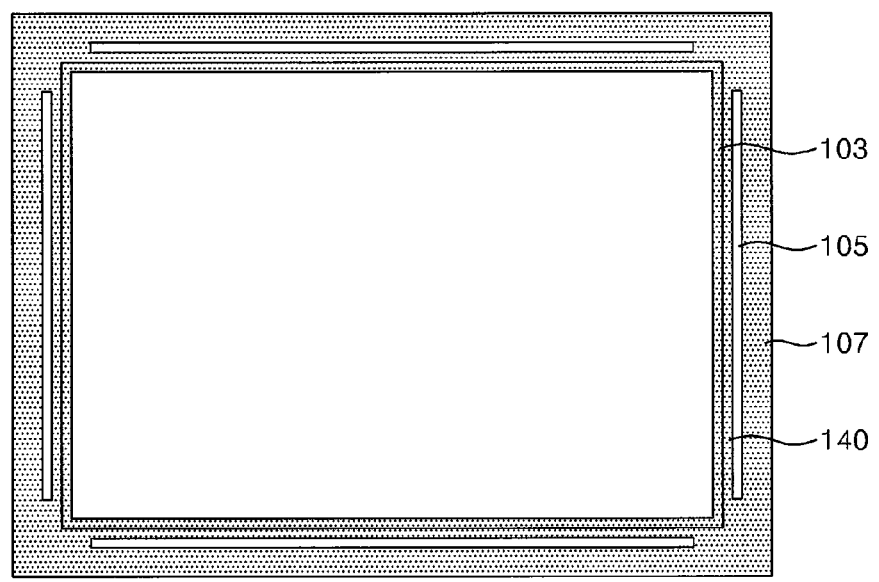

FIG. 11 is a perspective view showing a receiving container in accordance with a fourth exemplary embodiment, FIG. 12 is a cross-sectional view showing the receiving container taken along the line IV-IV' shown in FIG. 11, and FIGS. 13A and 13B are perspective and plan views illustrating the receiving container shown in FIG. 11.

Referring to FIGS. 11 and 12, a receiving container 150 includes a mold frame 100 and a strength enhancing means 130.

The strength enhancing means 130 includes a base plate 131 for supporting a lower part of a backlight assembly 95, a strength enhancing portion 139 connected to a base plate 131, and a connecting portion 135 for connecting the base plate 131 and the strength enhancing portion 139.

As shown in FIGS. 13A and 13B, the mold frame 100 includes a seating portion 103, a fixing portion 107, a hole 105, and a protective wall 140. The seating portion 103 positions the backlight assembly and supports an LCD panel. The fixing portion 107 connected to the seating portion 103 fixes a position of the LCD panel. The hole 105 is formed between the seating portion 103 and the fixing portion 107.

The protective wall 140 is formed to extend from an upper side of the seating portion 103. The protective wall 140 is formed between a side surface of the LCD panel and the strength enhancing portion 139 of the strength enhancing means 130. The protective wall 140 is formed in contact with the strength enhancing portion 139 as shown in FIG. 11. The protective wall 140 can be formed to be spaced from the strength enhancing portions 139. The protective wall 140 prevents the side surface of the LCD panel from being damaged when the LCD panel moves.

Next, a method of manufacturing the receiving container in accordance with the first exemplary embodiment will be described in detail with reference to FIGS. 14A to 18B.

FIGS. 14A to 18B are cross-sectional views illustrating the method of manufacturing the receiving container in accordance with the first exemplary embodiment.

Figure 14A:
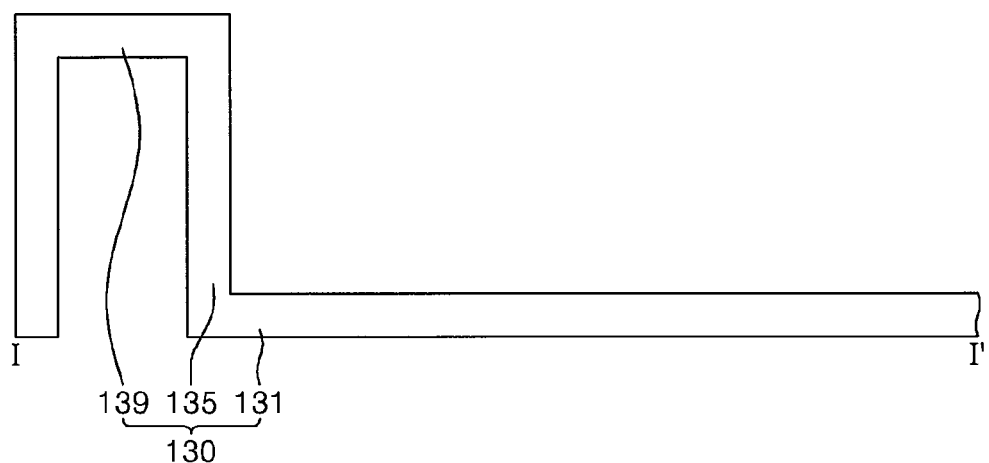
FIGS. 14A to 18B are cross-sectional views illustrating a method of manufacturing the receiving container in accordance with the first exemplary embodiment.
Figure 14B:
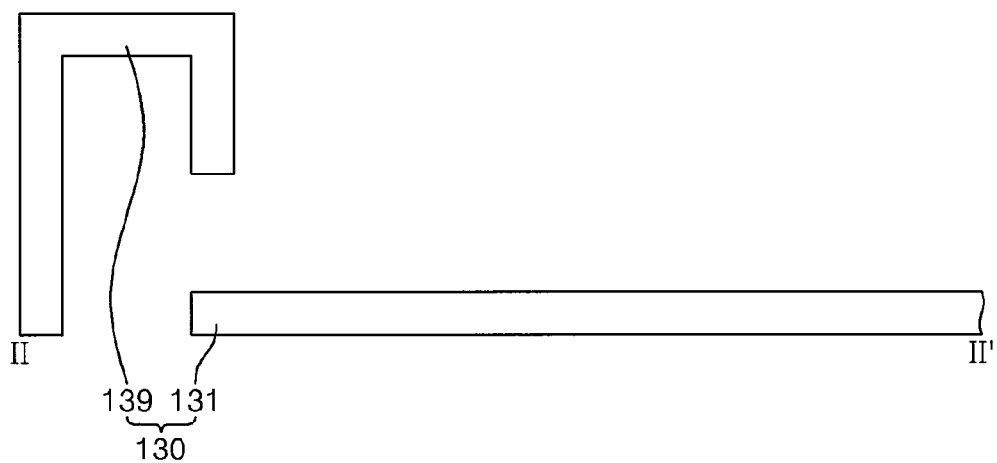

First, as shown in FIGS. 14A and 14B, a strength enhancing means 130 is prepared. The strength enhancing means 130 is formed with a metal material and includes a base plate 131 formed in a lowest part, a connecting portion 135 formed to be vertical to the base plate 131, and a strength enhancing portion 139 formed to extend from the connecting portion 135.

Figure 15A:
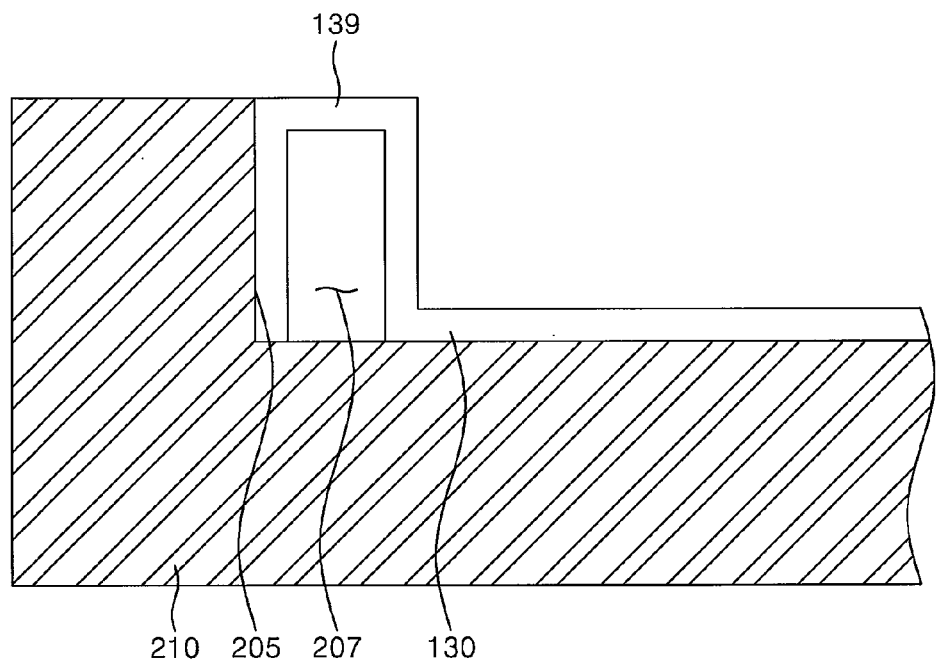
Figure 15B:
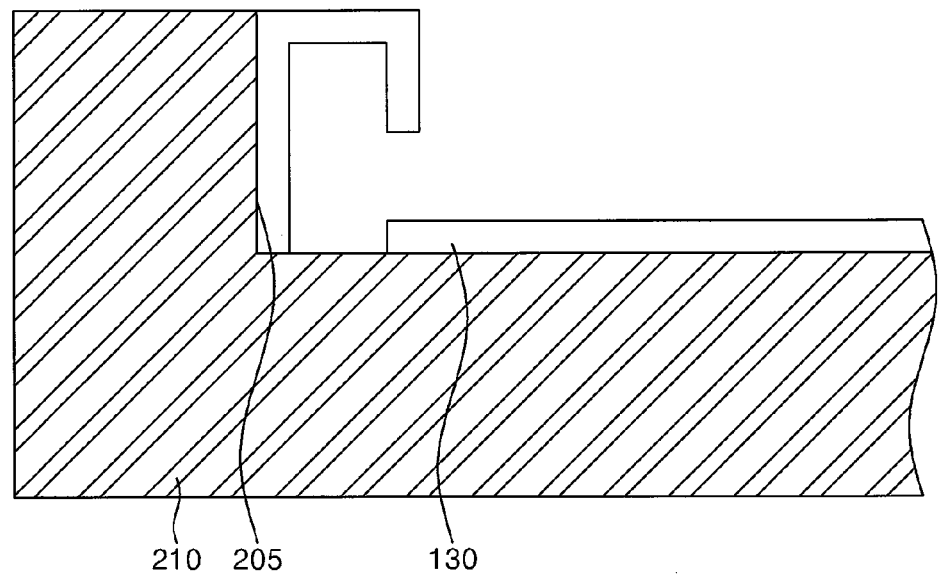
Figure 16A:
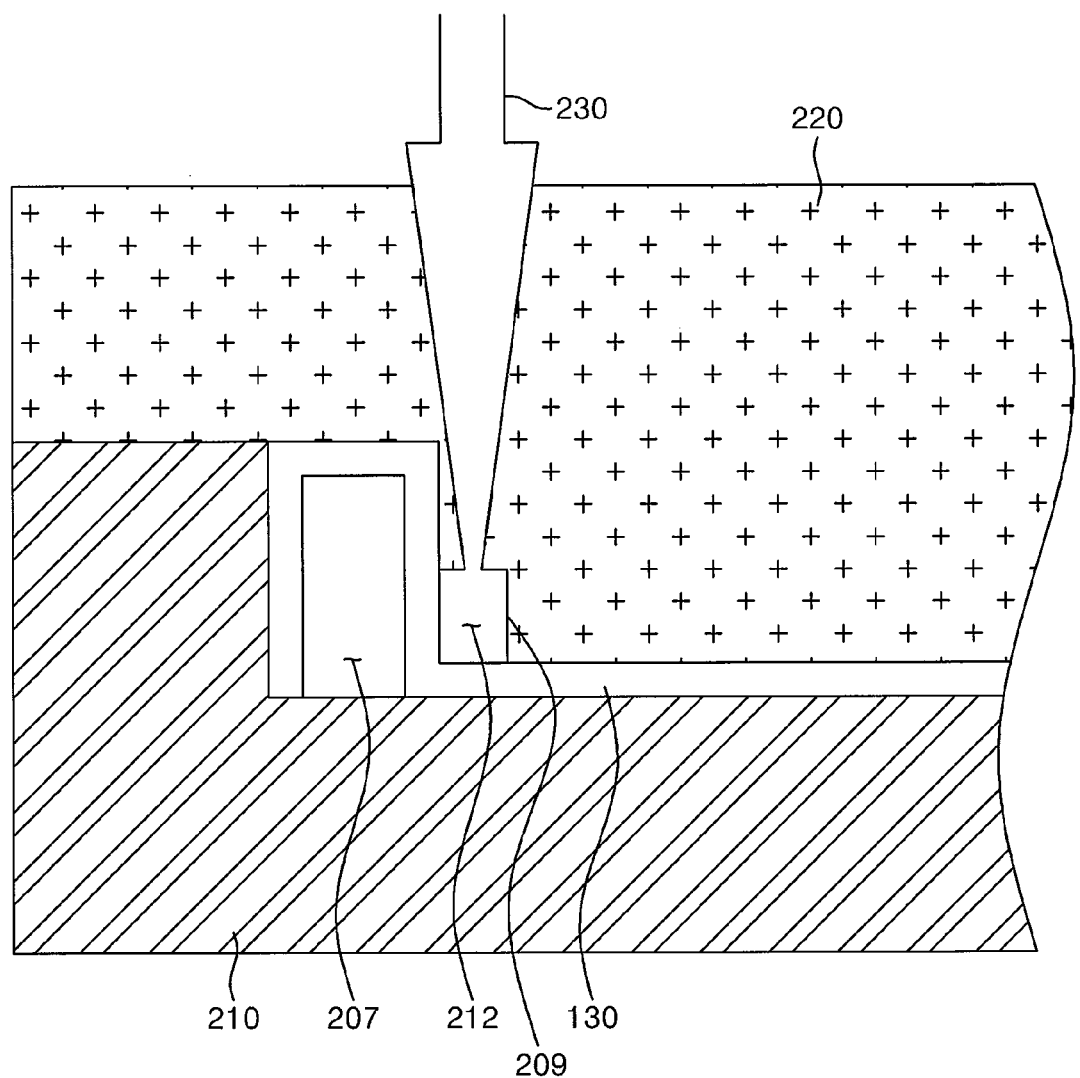
Figure 16B:
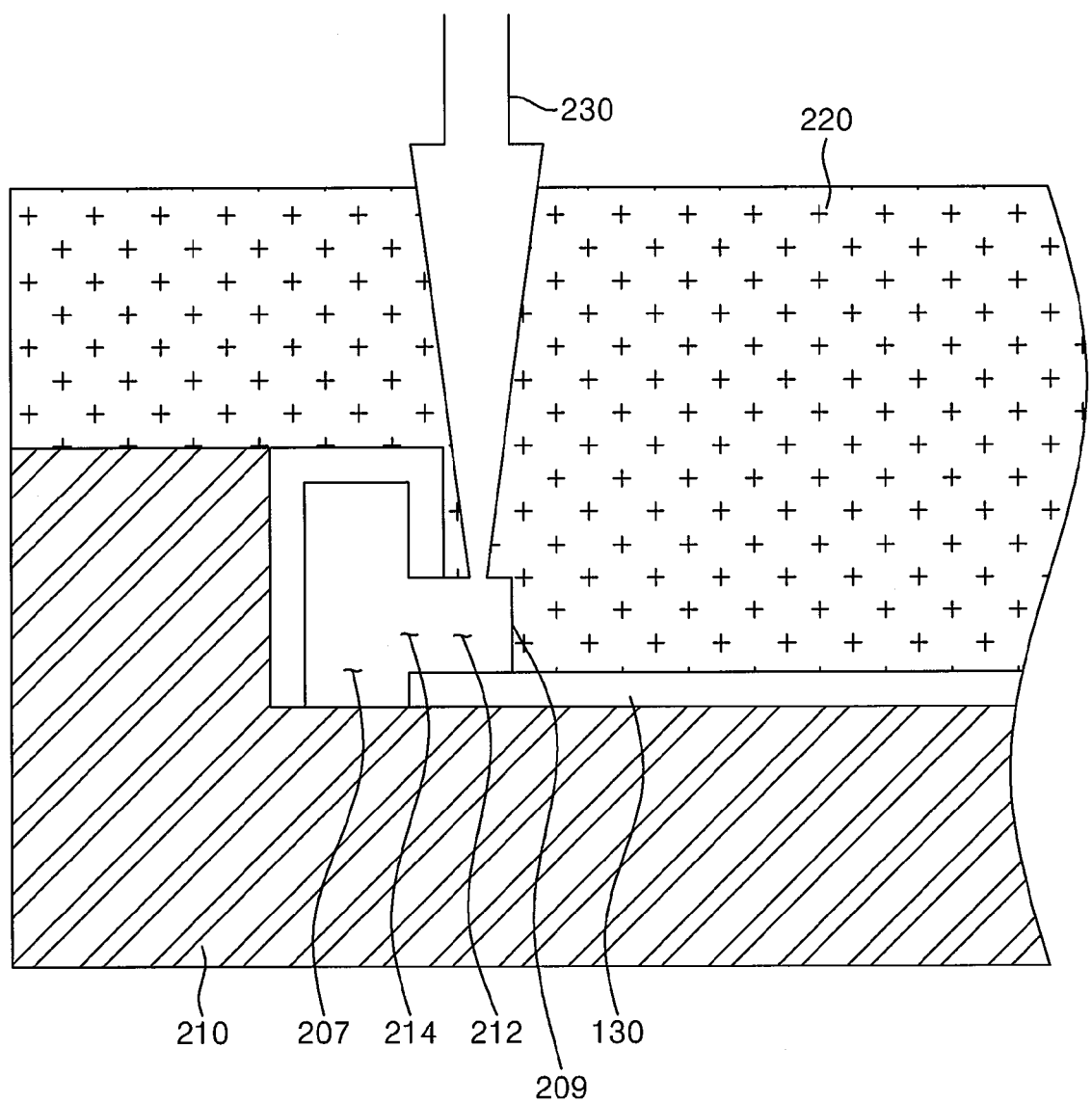

As shown in FIGS. 15A and 15B, the strength enhancing means 130 is fixed to a fixed mold 210. Specifically, the strength enhancing means 130 is fixed to a groove 205 formed in the fixed mold 210. A fixing portion generating hole 207 is formed in which a fixing portion of a mold frame is formed by the strength enhancing portion 139 of the strength enhancing means 130. Next, as shown in FIGS. 16A and 16B, the fixed mold 210 is connected to a movable mold 220. The movable mold 220 includes a seating portion generating portion 209 in which a seating portion of the mold frame is formed. When the fixed mold 210 and the movable mold 220 are connected, a seating portion generating hole 212 is formed in which the seating portion is formed by the seating portion generating portion 209. As shown in FIG. 16B, the seating portion generating hole 212 is connected to the fixing portion generating hole 207 by a contacting portion generating hole 214. The movable mold 220 includes a resin inlet 230 into which a resin is injected. The resin inlet 230 is connected to the seating portion generating portion 209.

Figure 17A:
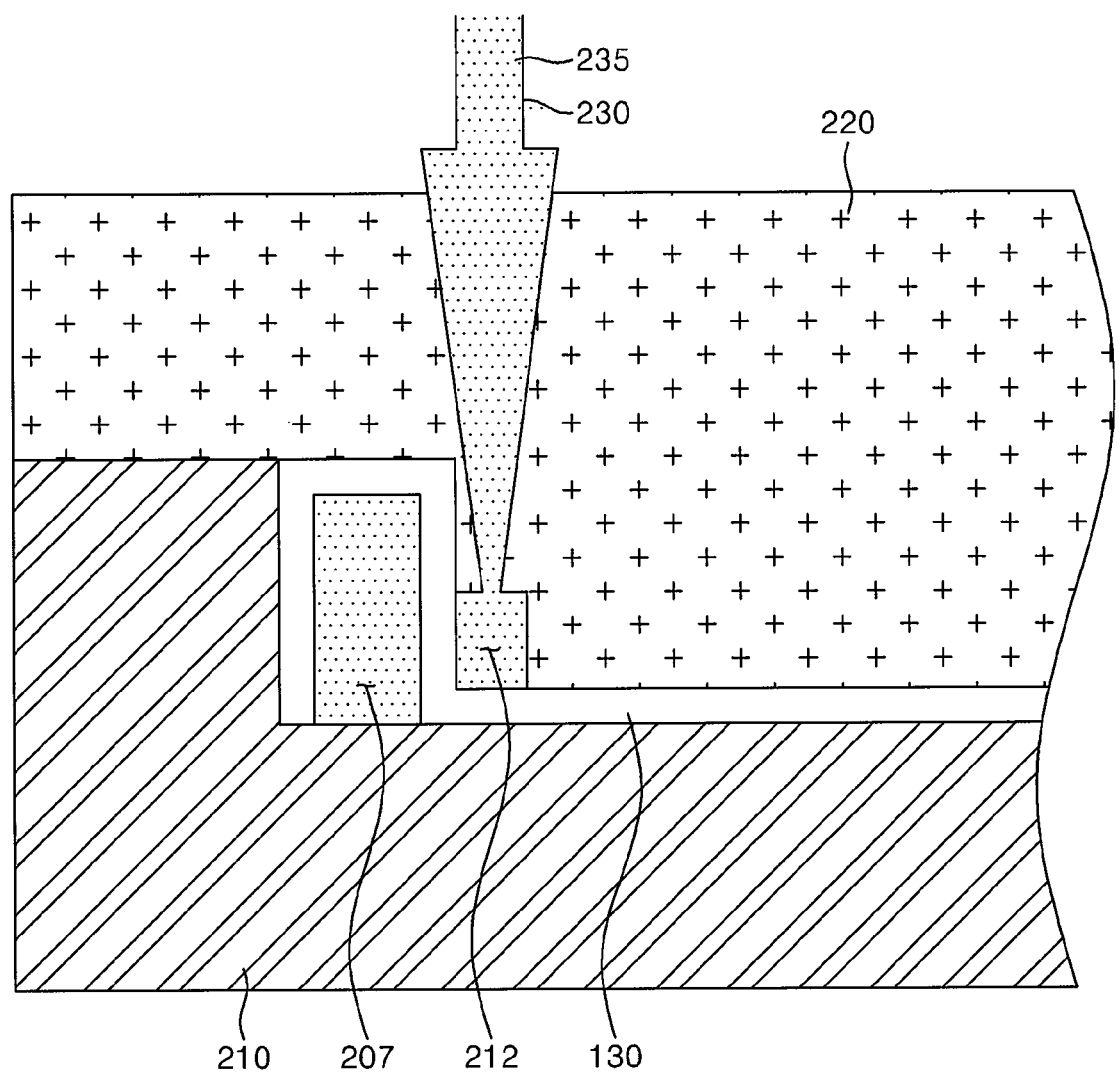
Figure 17B:
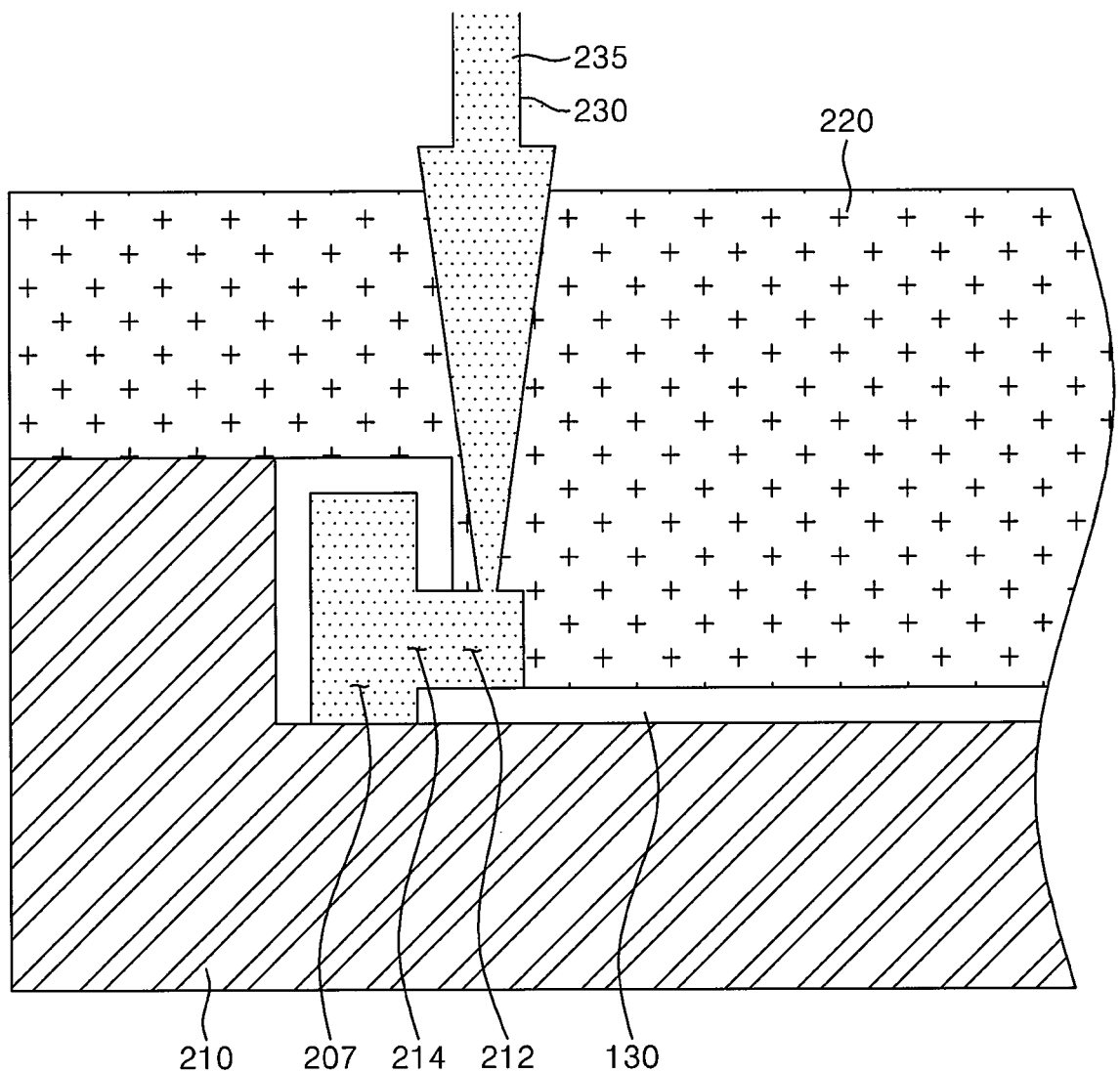
Figure 18A:
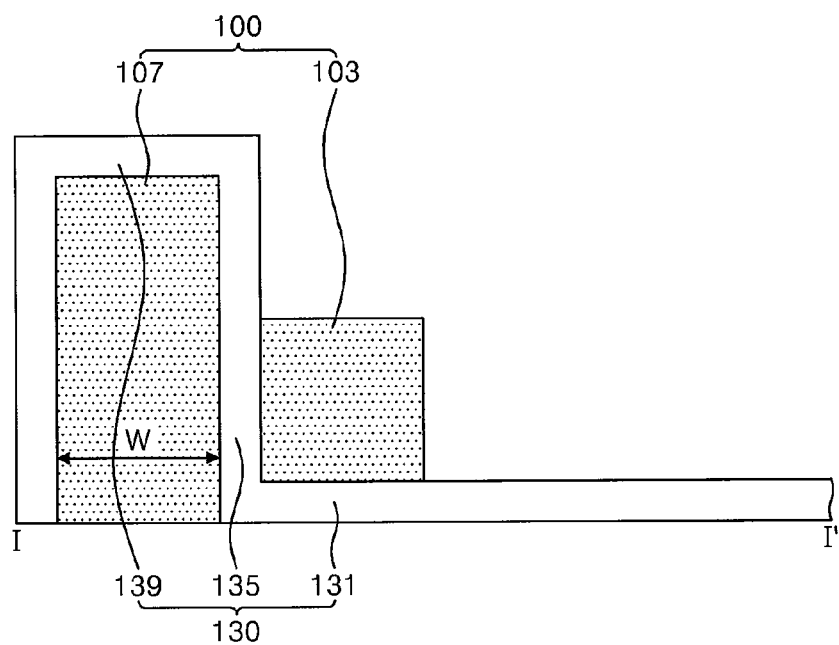
Figure 18B:
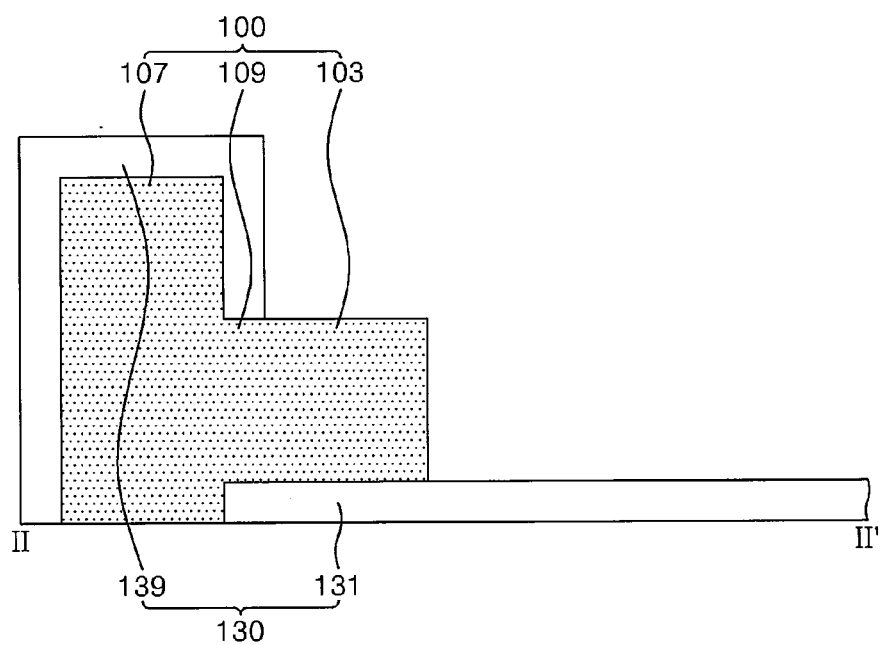

As shown in FIGS. 17A and 17B, a resin material 235 is injected into the resin inlet 230. Specifically, when the resin material 235 is injected into the resin inlet 230, the resin material 235 flows into the seating portion generating hole 212, and then flows into the fixing portion generating hole 207 through the contacting portion generating hole 214. Then, the resin material 235 is cured with heat or laser, and the fixed mold 210 and the movable mold 220 are separated. Accordingly, a receiving container 150 in which the mold frame 100 and the strength enhancing means 130 are connected is formed as shown in FIGS. 18A and 18B.

As described above, in one embodiment, an LCD includes a receiving container having an attached strength enhancing means. Specifically, the mold frame includes a fixing portion having a width and a strength enhancing portion of the strength enhancing means is formed to surround the fixing portion. The strength enhancing portion absorbs an external impact applied to the LCD and protects an LCD panel and a backlight assembly from the impact. The mold frame includes a protective wall. The protective wall prevents a side surface of the LCD panel from being damaged when the LCD panel moves.

While the invention has been shown and described in connection with the exemplary embodiments, it will be apparent to those skilled in the art that modifications and variations can be made without departing from the spirit and scope of the invention as defined by the appended claims.

What is claimed is:

1. A receiving container for a display device including a display panel, the receiving container comprising:
   a mold frame; and
   a strength enhancing frame,
   wherein the mold frame includes a first portion and a second portion connected to the first portion, the second portion comprises a first surface facing the display panel when the display panel is installed in the mold frame, a second surface facing opposite to the first surface, and a third surface connecting the first and second surfaces, the first to third surfaces being outer surfaces of the second portion,
   wherein the strength enhancing frame includes:
      a base plate; and
      a strength enhancing portion connected to the base plate,
   wherein the strength enhancing portion extends from the base plate to at least partially cover each of the first to third surfaces of the second portion, and
   wherein the strength enhancing portion comprises:
      a first part which is interposed between the first surface and the display panel when the display panel is installed in the mold frame,
      a fifth surface in contact with the first surface,
      a sixth surface opposite to the fifth surface and positioned for guiding the display panel, and
      a second part in contact with the second and the third surfaces of the second portion;
   wherein the mold frame comprises an opening formed between the first portion and the second portion; and
   wherein the strength enhancing frame comprises a connecting portion passing through the opening and connecting the strength enhancing portion and the base plate.

2. The receiving container according to claim 1, wherein a width of the second portion is at least 0.5 μm.

3. The receiving container according to claim 1, wherein the strength enhancing portion further comprises an inner wall connected to an inner side surface of the second portion and a part of the base plate.

4. The receiving container according to claim 1, wherein the strength enhancing portion is formed between an upper part and a lower part of an outer sidewall of the second portion.

5. The receiving container according to claim 1, further comprising:
an auxiliary portion connected to the second portion and formed in a lower side of the strength enhancing portion.

6. The receiving container according to claim 5, wherein the auxiliary portion is formed to have a same width as the strength enhancing portion.

7. The receiving container according to claim 1, wherein the strength enhancing portion is formed to surround a total of an outer side surface of the second portion.

8. The receiving container according to claim 1, wherein the strength enhancing portion is formed up to a lower part of the second portion.

9. The receiving container according to claim 1, wherein the mold frame is formed of a plastic material.

10. The receiving container according to claim 1, wherein the strength enhancing means is formed of a metal material.

11. A liquid crystal display comprising:
a liquid crystal display panel for displaying an image;
a backlight assembly for supplying light to the liquid crystal display panel; and
a receiving container for receiving the liquid crystal display panel and the backlight assembly,
wherein the receiving container comprises a mold frame and a strength enhancing frame,
the mold frame comprising:
a first portion and a second portion connected to the first portion, the second portion comprising a first surface facing the display panel when the display panel is installed in the mold frame, a second surface facing opposite to the first surface, and a third surface connecting the first and second surfaces, the first to third surfaces being outer surfaces of the second portion, and
the strength enhancing frame comprising:
a base plate, and
a strength enhancing portion connected to the base plate, wherein the strength enhancing portion extends from the base plate to at least partially cover each of the first to third surfaces of the second portion, and
wherein the strength enhancing portion comprises:
a first part which is interposed between the first surface and the display panel when the display panel is installed in the mold frame,
a fifth surface in contact with the first surface,
a sixth surface opposite to the fifth surface and positioned for guiding the display panel, and
a second part in contact with the second and the third surfaces of the second portion;
wherein the mold frame comprises an opening formed between the first portion and the second portion; and
wherein the strength enhancing frame comprises a connecting portion passing through the opening and connecting the strength enhancing portion and the base plate.

12. The liquid crystal display according to claim 11, wherein the first portion positions the backlight assembly and supports the liquid crystal display panel.

13. The liquid crystal display according to claim 11, wherein the second portion positions the liquid crystal display panel.

* * * * *